United States Patent [19]

Faitani et al.

[11] 4,292,274

[45] Sep. 29, 1981

[54] CATALYTIC REACTOR WITH IMPROVED BURNER

[75] Inventors: Joseph J. Faitani, Hartford; George W. Austin, Glastonbury; Terry J. Chase, Somers; George T. Suljak, Vernon; Robert J. Misage, Manchester, all of Conn.

[73] Assignee: United Technologies Corporation, Hartford, Conn.

[21] Appl. No.: 175,226

[22] Filed: Aug. 4, 1980

[51] Int. Cl.³ .............................................. B01J 19/26
[52] U.S. Cl. ........................................ 422/197; 48/94; 422/198; 422/220
[58] Field of Search .............. 422/190, 191, 197, 19 E, 422/220; 48/94

[56] References Cited

U.S. PATENT DOCUMENTS

| | | | |
|---|---|---|---|
| 2,526,748 | 10/1950 | Hill | 158/117 |
| 2,559,589 | 7/1951 | Brierly | 158/76 |
| 2,578,422 | 12/1951 | Guillot | 158/76 |
| 3,308,869 | 3/1967 | Livingston | 158/28 |
| 3,648,186 | 8/1972 | Helmrich | 239/400 |
| 3,706,520 | 12/1972 | Grimm et al. | 431/10 |
| 3,729,285 | 4/1973 | Schwedersky | 431/8 |
| 4,095,929 | 6/1978 | McCartney | 431/19 |
| 4,098,587 | 7/1978 | Krar et al. | 48/94 |
| 4,098,588 | 7/1978 | Buswell et al. | 48/94 |
| 4,099,908 | 7/1978 | Beckmann et al. | 431/284 |

OTHER PUBLICATIONS

FCG-1 Module Demonstrator Monthly Report No. 14, Sep. 15, 1977, p.10 & 6 E.
FCG-1 Module Demonstrator Monthly Report No. 16, Nov. 15, 1977, p. 9 & 11.
FCG-1 Module Demonstrator Monthly Report No. 17, Dec. 15, 1977, p. 10 & 11.
FCG-1 Module Demonstrator Monthly Report No. 18, Jan. 15, 1977, p. 10 & 11.

Primary Examiner—William A. Cuchlinski, Jr.
Attorney, Agent, or Firm—Stephen E. Revis

[57] ABSTRACT

To more uniformly distribute heat to the plurality of catalyst tubes in a catalytic reaction furnace, the burner disposed in the furnace above the tops of the tubes includes concentric primary and secondary annular fuel and air outlets. The fuel-air mixture from the primary outlet is directed towards the tubes adjacent the furnace wall, and the burning secondary fuel-air mixture is directed horizontally from the secondary outlet and a portion thereof is deflected downwardly by a slotted baffle toward the tubes in the center of the furnace while the remaining portion passes through the slotted baffle to another baffle disposed radially outwardly therefrom which deflects it downwardly in the vicinity of the tubes between those in the center and those near the wall of the furnace.

3 Claims, 2 Drawing Figures

CATALYTIC REACTOR WITH IMPROVED BURNER

The Government has rights in this invention pursuant to Contract No. EX-76-C-01-2102 awarded by the Department of Energy.

DESCRIPTION

1. Technical Field

This invention relates to catalytic reaction apparatus, and more particularly to a burner for such apparatus.

2. Background Art

Catalytic steam reforming, or the like, is often accomplished within a plurality of elongated, catalyst filled tubes disposed within a furnace, with the heat for the reaction being provided by a burner disposed within the furnace above the reaction tubes. Such an apparatus is shown and described in commonly owned U.S. Pat. No. 4,098,588 Buswell et al. An important aspect of obtaining a highly energy efficient system is the uniform heating of all the tubes. In the hereinabove mentioned Buswell et al patent this is partly accomplished by a burner arrangement comprised of a burner fuel manifold, an air manifold, and a large number of burner nozzles. The burner nozzles each comprise small, cylindrical, vertically oriented fuel tubes, each fuel tube outlet being surrounded by an air outlet in communication with the air manifold. Fuel for the furnace enters the fuel manifold and passes into a burner cavity above the reaction tubes by way of the fuel tubes which are appropriately distributed over the cross section of the furnace. Air enters the air manifold, and from there enters the burner cavity by way of the annular air outlets surrounding each fuel tube. The fuel and air mix at the outlet of each burner nozzle and burn within the burner cavity. This arrangement was found not to be completely satisfactory because the large sheet metal plate holding the nozzles in prone to distortion from thermal gradients resulting in misalignment of the nozzles and distortion of the temperature pattern in the burner cavity.

Other patents representative of burners designed to introduce fuel and air into burner cavities at more than one location or as a plurality of concentric cones of fuel and air are U.S. Pat. Nos. 2,526,748; 2,559,589; 2,578,422; 3,308,869; 3,684,186; 3,706,520; 3,729,285; 4,095,929; and 4,099,908. None of these are related to uniformly heating catalytic reaction tubes disposed within a furnace.

DISCLOSURE OF INVENTION

An object of the present invention is an improved catalytic reaction apparatus, and more particularly a catalytic reaction apparatus including improved burner means for uniformly distributing heat to a plurality of reaction tubes disposed within a furnace.

According to the present invention, a burner disposed within a catalytic reaction furnace above a plurality of vertically oriented reaction tubes within the furnace includes a primary annular air and fuel outlet means constructed and arranged such that air and fuel exiting therefrom is directed toward the tops of reaction tubes adjacent the furnace wall, a secondary annular air and fuel outlet means disposed radially inwardly from and concentric with the primary annular air and fuel outlet means constructed and arranged to direct the air and fuel exiting therefrom substantially horizontally, the burner also including first baffle means disposed radially outwardly from the secondary air and fuel outlet means for deflecting only a portion of the horizontally flowing fuel and air mixture from the secondary outlet means downwardly toward the tops of the reaction tubes nearest the center of the furnace, and second baffle means disposed radially outwardly from said first baffle means and constructed and arranged to deflect a portion of the horizontally flowing fuel and air mixture downwardly toward the tops of reaction tubes disposed between those tubes adjacent the furnace wall and those tubes nearest the center of the furnace.

A reaction apparatus in accordance with the present invention has been able to produce a temperature profile radially across a cylindrical reaction furnace in the vicinity of the tops of the reaction tubes which is very uniform and which does not have the potential for hot spots associated with the plurality of vertically oriented burner nozzles of the hereinbefore mentioned Buswell et al patent.

BEST MODE FOR CARRYING OUT THE INVENTION

Figure 1:
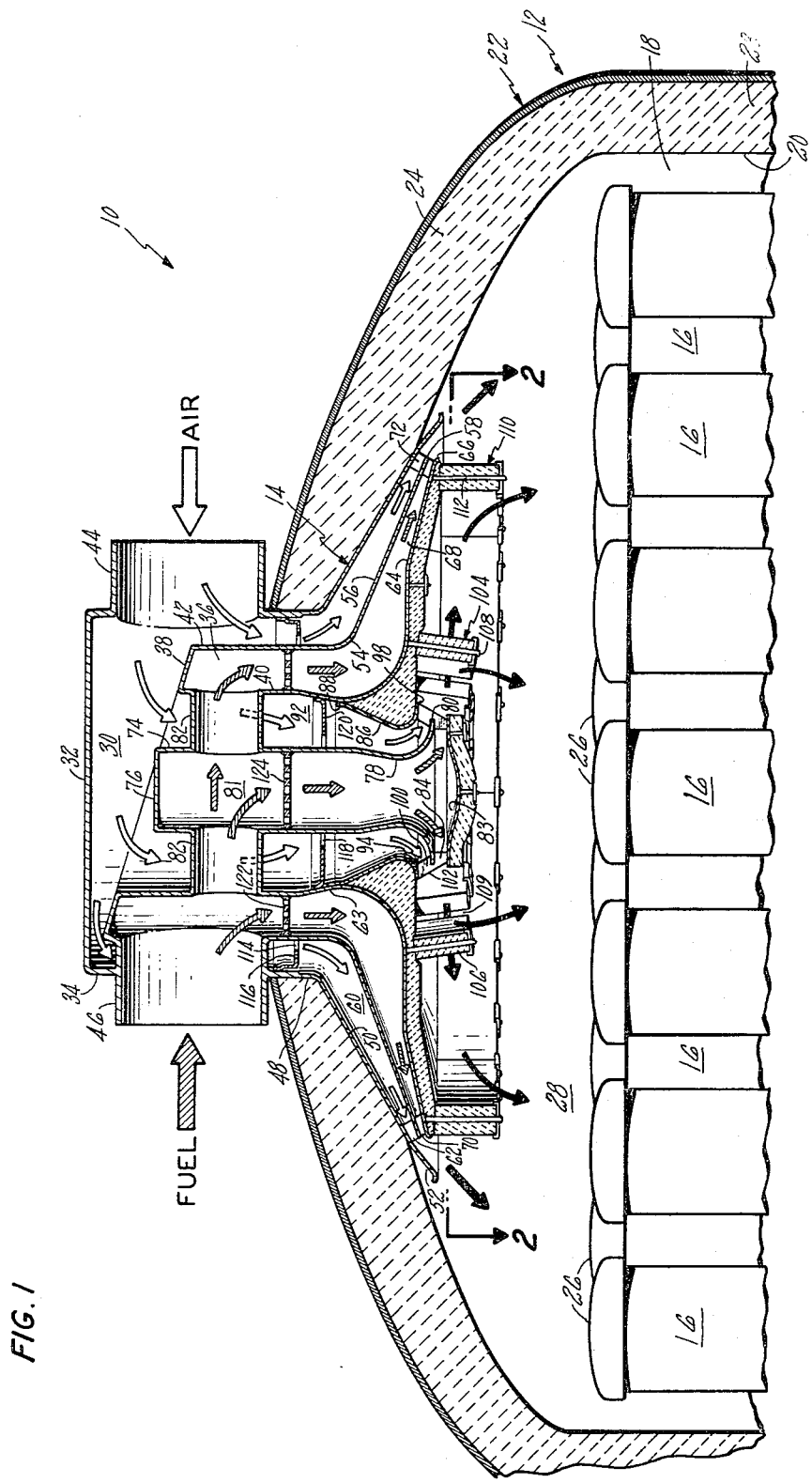
FIG. 1 is a vertical cross-section view, taken along the line 1—1 of FIG. 2, of a reaction apparatus according to the present invention.
Figure 2:
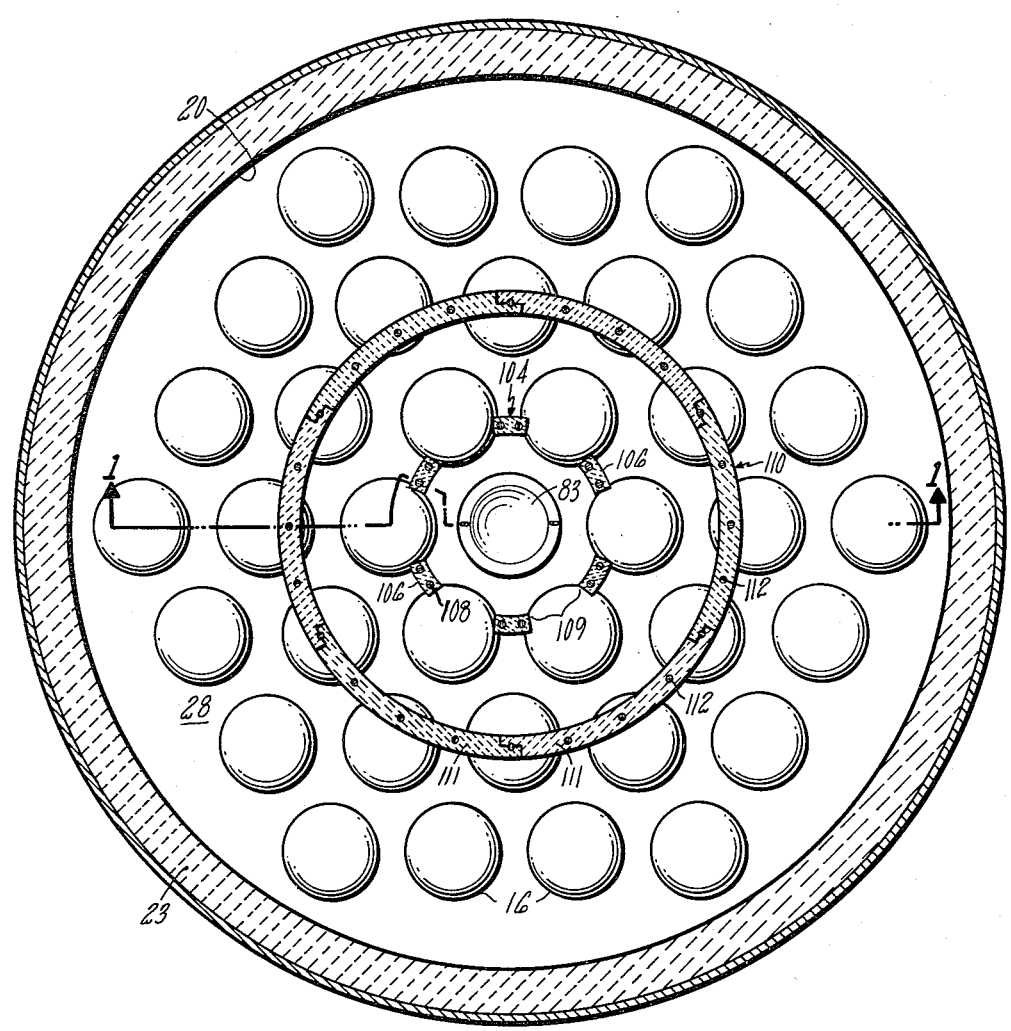
FIG. 2 is a cross-sectional view taken along the line 2—2 in FIG. 1.

Consider, as an exemplary embodiment of the present invention, the catalytic reaction apparatus 10 of FIGS. 1 and 2. In this embodiment, the apparatus is for the purpose of steam reforming a reformable hydrocarbon fuel in the presence of a suitable catalyst in order to produce hydrogen. The apparatus 10 comprises a furnace 12 including a burner 14. The wall 22 of the furnace have an inside surface 20 and comprises a vertical, cylindrical wall portion 23, a top wall portion 24, and a horizontal bottom wall portion (not shown) below the tubes 16. Disposed within the the furnace 12 is a plurality of closely spaced reaction tubes 16 distributed substantially uniformly within an enclosed space 18 defined by the inside surface 20 of the furnace wall 22. The burner 14 is disposed in the top wall portion 24 of the furnace 12 above the upper ends 26 of the reaction tubes 16 defining a combustion cavity 28 therebetween. Several different reaction tube designs, and the arrangement thereof within a furnace of the type shown herein are described in hereinabove mentioned commonly owned U.S. Pat. No. 4,098,588, or from several other related commonly owned U.S. Pat. Nos., such as 4,098,589 and 4,098,587, all of which are incorporated herein by reference.

The burner includes a generally cylindrically air manifold 30 defined by a horizontal top wall 32 and a cylindrical sidewall 34. Disposed within the air manifold 30 is an annular fuel manifold 36 defined by a to wall 38, inner cylindrical sidewall 40 and outer cylindrical sidewall 42. A tubular air inlet 44 intersects the sidewall 34 and feeds air into the air manifold 30. A tubular fuel inlet 46 passes through the wall 34, intersects the cylindrical sidewall 42, and feeds a gaseous fuel into the fuel manifold 36.

The lower end 48 of the sidewall 34 flares radially outwardly and downwardly to form a conical wall 50 which terminates with a deflector lip 52 inside the combustion cavity 28. The lower end 54 of the fuel manifold outer sidewall 42 also flares radially outwardly and downwardly forming a second conical wall 56 having an outer end 58. The first conical wall 50 and the second conical wall 56 define an annular primary air passageway 60 and an annular primary air outlet 62.

The lower end 63 of the inner sidewall 40 of the fuel manifold 36 flares radially outwardly and slightly downwardly to form a third conical wall 64 having an outer end 66. The third conical wall 64 and the wall 56 define a primary fuel passageway 68 which terminates as an annular primary fuel outlet 70 below but adjacent the primary annular air outlet 62. A plurality of support vanes 72 spaced about the periphery of the annular air and fuel outlets 62, 70 provide rigidity to the structure and maintain the proper spacing between the walls.

A central cylindrical tube 74 concentric with the cylindrical wall 40 is closed at its upper end 76 and is open at its lower end 78. The tube 78 flares radially outwardly from its lower end 78 to a substantially horizontal orientation at its outer edge 80. This tube 74 defines the secondary fuel passageway 81. Several tubes 82 (two of which are shown in FIG. 1) interconnect the fuel manifold 36 and the secondary fuel passageway 81 for feeding fuel to said passageway. A horizontally oriented circular plate 83 is centered on the axis of the tube 74, is spaced below the edge 80, and has an outer diameter which is approximately the same as the diameter of the edge 80. The edge of the plate 83 forms an annular secondary fuel outlet 84 with the edge 80.

A radially inwardly and downwardly directed conical wall 86 blends smoothly at its upper end 88 with the lower end 63 of the cylindrical wall 40 and these walls are spaced radially outwardly from the wall of the tube 74 to form an annular secondary air passageway 92 therebetween. The lower end 94 of the wall 86 flares radially outwardly such that its outer edge 98 is adjacent but spaced from the outer edge 80 of the wall 74, thereby forming an annular secondary air outlet 100. A plurality of circumferentially spaced support vanes 102 provide rigidity to the structure and maintain the appropriate spacing between the plate 83 and the outer edges 80, 98 of the walls 78, 94, respectively.

An interrupted annular baffle 104 comprises a plurality of arcuate segments 106 extending substantially vertically from the wall 64. The segments are secured thereto by pins 108 and are uniformly spaced on the circumference of a circle which is radially outward of and concentric with the secondary air and fuel outlets. The segments 106 are not large enough to form a complete ring. Thus, there are gaps 109 in the baffle between adjacent segments. In this embodiment the gaps comprise about two-thirds of the circumference of the circle.

A complete annular baffle 110 is concentric with the interrupted annular baffle 104 and is spaced radially outwardly therefrom at approximately the same vertical location. The baffle 110 forms a solid vertically extending cylindrical wall, and is made up of six arcuate segments 111 which interlock with and abut each other and which are secured to the wall 64 by pins 112.

In operation air enters the air manifold 30 via the tubular air inlet 44 and is divided between the primary air passageway 60 and the secondary air passageway 92. The air flow rates are determined by the pressure drops through these passageways. The pressure drop in the primary annular air passageway is set by the annular gap 114 between the wall 42 and an annular baffle plate or flow restrictor 116. Similarly, the pressure drop in the secondary air passagewy 92 is set by the annular gap 118 between the wall 74 and the annular baffle plate or flow restrictor 120. A gaseous fuel for the burner is fed to the fuel manifold 36 via the tubular fuel inlet 46. A portion of the fuel flows through the primary fuel passageway 68 while the remainder passes through the tubes 82 into the secondary fuel passagewy 81. The apportionment of the fuel is controlled by the pressure drops across the passageways 36, 81 and is set by the open area of the perforated plates or flow restrictors 122, 124 extending across the primary and secondary fuel passagewys 36, 81 respectively.

The primary air from the passageway 60 and the primary fuel from the passageway 68 mix and ignite as they exit the annular air and fuel outlets 62, 70, respectively. More precisely, the primary air and primary fuel are discharged into the combustion cavity as adjacent annular or conical sheets, with burning of the primary fuel and air taking place at their interface 360° around the primary air and fuel outlets. The burning mixture is directed, by the deflector lip 52, toward the upper ends 26 of the tubes 16 adjacent the furnace wall 20.

In a similar manner the secondary air and secondary fuel are discharged substantially horizontally from the annular outlets 100, 84, respectively, as adjacent annular sheets, with burning of the secondary fuel and air taking place at their interface 360° around the annular outlets. In this instance, however, a portion of the burning fuel-air mixture strikes the segments 106 of the baffle 104; and that portion is deflected downwardly toward the upper ends 26 of the tubes 16 nearest the center of the furnace 12. The burning fuel-air mixture which passes through the gaps 109 between the segments 106 strikes the annular baffle 110, which is a complete ring; and this portion of the burning fuel-air mixture is deflected downwardly toward the upper ends 26 of the tubes 16 which are disposed between the tubes adjacent the furnace wall 20 and the tubes nearest the center of the furnace.

For the reaction apparatus of this embodiment, which comprises thirty-seven reactor tubes 16 each having an outer diameter of about 10.0 inches disposed in a furnace 12 having an inner wall diameter of about 98.0 inches, the maximum temperature variation radially across the furnace at the upper ends 26 of the tubes 16 is expected to be no more than about 100° F. (38° C.).

Some adjustment of the temperature profile for the particular embodiment shown may be accomplished by modifying the pressure drops through the fuel and air passageways by appropriate design of the baffle plates 116, 120 and the perforated plates 122, 24. Additional adjustment may be accomplished by selecting the appropriate gap area to segment area for the interrupted annular baffle 104, or by putting slots in the outer annular baffle 110 to permit some of the burning secondary fuel and air mixture to pass therethrough. Temperatures nearer the furnace wall may be somewhat adjusted by modifying the slope of the deflector 52. Basically, the object is to divert an appropriate proportion of the total energy to various areas of the combustion cavity in accordance with the number of tubes in that area, but taking into account other factors, such as the additional radiant heat received by the tubes nearest the furnace wall.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. Catalytic reaction apparatus comprising:
   A. a furnace having cylindrical, vertical wall means and top and bottom wall means in communication with said vertical wall means defining an enclosed space within said furnace;
   B. a plurality of vertical, closely spaced, reaction tubes distributed substantially uniformly within said enclosed space and adapted to have catalyst disposed therein, said tubes each having an upper end, said upper ends being spaced below said top wall means of said furnace defining a combustion cavity in said enclosed space above said tube upper ends; and
   C. burner means disposed in said furnace above said tube upper ends and including:
      a. primary annular air and fuel outlet means disposed radially inwardly from said cylindrical wall means and constructed and arranged to cause the air and fuel to exit therefrom into said combustion cavity as concentric, adjacent annular sheets, including means for directing the exiting air and fuel toward said tube ends adjacent said cylindrical wall means;
      b. secondary annular air and fuel outlet means disposed radially inwardly from and concentric with said primary air and fuel outlet means constructed and arranged to cause the air and fuel to exit substantially horizontally therefrom into said combustion cavity as concentric, adjacent annular sheets;
      c. first annular baffle means concentric with said secondary air and fuel outlet means and disposed radially outwardly therefrom for deflecting a first portion of the fuel and air from said secondary outlet means downwardly toward said tube ends nearest the center of said furnace, said first baffle means including gaps therein permitting a second portion of the fuel and air from said secondary outlet means to pass horizontally therethrough; and
      d. second annular baffle means concentric with and disposed radially outwardly from said first annular baffle means and constructed and arranged to deflect at least a portion of said second portion of the fuel and air downwardly toward said tube ends which are disposed between said tube ends adjacent said cylindrical wall means and said tube ends nearest the center of said furnace.

2. The catalytic reaction apparatus according to claim 1 wherein said second annular baffle means is a solid ring for deflecting all of said second portion of the fuel air downwardly.

3. The catalytic reaction apparatus according to claim 2 wherein said first annular baffle means comprises arcuate segments spaced apart on the circumference of a circle defining said gaps therebetween.

* * * * *

UNITED STATES PATENT AND TRADEMARK OFFICE
CERTIFICATE OF CORRECTION

PATENT NO. : 4,292,274
DATED : September 29, 1981
INVENTOR(S) : Joseph J. Faitani et al It is certified that error appears in the above—identified patent and that said Letters Patent is hereby corrected as shown below:

Column 2, line 37: "have" should be --has--.

Column 2, line 57: "to" should be --top--.

Column 4, line 6: "passagewy" should be --passageway--.

Signed and Sealed this

Eighth Day of December 1981

[SEAL]

Attest:

GERALD J. MOSSINGHOFF

Attesting Officer    Commissioner of Patents and Trademarks